United States Patent
Yang et al.

(10) Patent No.: US 9,823,714 B2
(45) Date of Patent: Nov. 21, 2017

(54) HARD DISK QUICK RELEASE UNIT AND HARD DISK REPLACEMENT MODULE

(71) Applicant: ECHOSTREAMS INNOVATIVE SOLUTIONS, LLC, Arcadia, CA (US)

(72) Inventors: Chin-Hao Yang, New Taipei (TW); Chang-Feng Chu, New Taipei (TW); Gene Jing-Luen Lee, New Taipei (TW)

(73) Assignee: ECHOSTREAMS INNOVATIVE SOLUTIONS, LLC, Arcadia, CA (US)

( * ) Notice: Subject to any disclaimer, the term of this patent is extended or adjusted under 35 U.S.C. 154(b) by 6 days.

(21) Appl. No.: 15/130,432

(22) Filed: Apr. 15, 2016

(65) Prior Publication Data
US 2017/0228000 A1    Aug. 10, 2017

(30) Foreign Application Priority Data
Feb. 5, 2016  (TW) .............................. 105202103 U

(51) Int. Cl.
G06F 1/16    (2006.01)
G06F 1/18    (2006.01)

(52) U.S. Cl.
CPC .................................. *G06F 1/187* (2013.01)

(58) Field of Classification Search
CPC ...................................................... G06F 1/187
See application file for complete search history.

(56) References Cited

U.S. PATENT DOCUMENTS

| | | | | |
|---|---|---|---|---|
| 6,606,256 B1* | 8/2003 | Lee | .......................... | G06F 1/184 361/679.33 |
| 6,661,651 B1* | 12/2003 | Tanzer | .................... | G06F 1/187 248/581 |
| 8,243,435 B2* | 8/2012 | Li | ......................... | G11B 33/124 312/223.2 |
| 2004/0095716 A1* | 5/2004 | McAlister | ............... | G06F 1/187 361/679.33 |
| 2005/0047075 A1* | 3/2005 | Roesner | .................. | G06F 1/184 361/679.31 |
| 2011/0090638 A1* | 4/2011 | Matsui | ................. | G11B 33/128 361/679.37 |
| 2011/0299237 A1* | 12/2011 | Liang | ................... | G11B 33/128 361/679.38 |
| 2012/0218705 A1* | 8/2012 | Huang | .................... | G06F 1/187 361/679.37 |

(Continued)

*Primary Examiner* — Anthony Q Edwards
(74) *Attorney, Agent, or Firm* — Li & Cai Intellectual Property (USA) Office

(57) ABSTRACT

The instant disclosure relates to a hard disk quick release unit and a hard disk replacement module which includes a plurality of fixed guiding grooves and hard disk quick release units; each hard disk quick release unit includes a slidable guiding groove having at least a guiding member; at least a side fixing unit arranged adjacent to the outer side surface of the slidable guiding groove, the side fixing unit has a restricting groove, the guiding member engaged into the restricting groove for guiding the slidable guiding groove to move along a straight path; a cover board pivotally connected to the front end of the slidable guiding groove; and a resilient positioning member arranged on the front end of the slidable guiding groove, when the slidable guiding groove is moved to an exit position, the resilient positioning member engages with a side of the hard disk socket.

10 Claims, 13 Drawing Sheets

(56) References Cited

U.S. PATENT DOCUMENTS

| | | | |
|---|---|---|---|
| 2013/0099640 A1* | 4/2013 | Hu ....................... | G11B 33/124 |
| | | | 312/223.2 |
| 2015/0009619 A1* | 1/2015 | Yin ...................... | G11B 33/128 |
| | | | 361/679.39 |
| 2015/0268703 A1* | 9/2015 | Tu ........................ | G11B 33/124 |
| | | | 361/679.38 |

* cited by examiner

HARD DISK QUICK RELEASE UNIT AND HARD DISK REPLACEMENT MODULE

1. Technical Field

The instant disclosure relates to a hard disk quick release unit and a hard disk replacement module, in particular, to a hard disk quick release unit and a hard disk replacement module adapted to information devices such as servers, industrial computers, RAID (Redundant Array of Independent Disks) storage devices, portable external hard drive boxes and network attached storage (NAS).

2. Description of Related Art

Information devices such as servers, industrial computers, RAID storage devices, portable external hard drive boxes, network attached storage (NAS) generally employ an array hard disk replacement module for the storage devices. Along with the development and improvement of the network information, the information storage quantity and density of the information devices are increased and hence, the hard disk replacement modules have to accommodate more hard disks.

However, since all of the cases or casings of the storage devices such as web servers and industrial computers have limited dimensions, there is a need for a hard disk replacement module for accommodating more hard disks in the limited space while ensuring the convenience for servicing the hard disks.

The hard disk replacement modules in the prior art generally comprise a hard disk accommodating casing, and the hard disk accommodating casing has a plurality of hard disk sockets, each hard disk socket accommodates a hard disk replacement cartridge, each hard disk replacement cartridge has a hard disk accommodated therein, and the hard disks are replaceably installed in the hard disk sockets by the hard disk replacement cartridges.

The above hard disk replacement modules employ the hard disk replacement cartridges for inserting the hard disks in each hard disk socket and hence, when there is a need of inserting the hard disk into each hard disk socket, the following steps should be carried out: exiting the hard disk replacement cartridges from the hard disk socket, installing the hard disks into the cartridges, and inserting the hard disks along with the cartridges into each hard disk socket. Similarly, when the user intends to remove the damaged hard disk from the hard disk socket, he or she has to exit the hard disk along with the hard disk replacement cartridge then removing the hard disk from the replacement cartridge. Therefore, in the prior art, the user has to install the hard disk in the replacement cartridge and remove the hard disk from the cartridge during the operation of installing the hard disk or removing the hard disk. Accordingly, the hard disk replacement modules in the prior art have the disadvantages of high complexity for the hard disk installation and replacement procedure and is time-wasting.

In view of the above disadvantages, there is a need for an improved structure design for hard disk replacement modules to increase the convenience of the installation or replacement of the hard disks and reduce the operation time.

SUMMARY

The main object of the instant disclosure is to improve the convenience and operation time of the installation or replacement of the hard disks of the hard disk replacement units in the prior art.

An exemplary embodiment of the present disclosure provides a hard disk quick release unit comprising at least a side fixing unit, the side fixing unit is arranged on a side of the hard disk socket and has at least a restricting groove arranged thereon; a slidable guiding groove, the slidable guiding groove has an outer side surface and an inner side surface, the outer side surface of the slidable guiding groove is adjacent to the side fixing unit, the outer side surface of the slidable guiding groove has at least a guiding member arranged thereon, the a guiding member is slidably engaged into the restricting groove, a side of the hard disk facing the slidable guiding groove is fitted into the inner side of the slidable guiding groove, the slidable guiding groove is guided by the restricting groove of the side fixing unit and is moved back and forth between an exited position and an inserted position along a straight path; a cover board, the cover board is pivotally connected to the front end of the slidable guiding groove, when the slidable guiding groove is moved to the inserted position along with the hard disk, the cover board covers the opening of the hard disk socket; and a resilient positioning member, the resilient positioning member is arranged on the front end of the slidable guiding groove, the resilient positioning member has a resilient member and an engagement positioning portion, wherein the engagement positioning portion is protudingly arranged on the outer side surface of the resilient member, when the slidable guiding groove is moved to the exited position, the engagement positioning portion is driven by the resilient member and engaged to the front edge of the side fixing unit.

Another exemplary embodiment of the present disclosure provides a hard disk replacement module, comprising: a hard disk accommodating casing in which a plurality of hard disk sockets are formed, each hard disk socket has an opening for inserting a plurality of hard disks into the plurality of hard disk sockets; the two sides of each hard disk socket each has a fixed guiding groove and a hard disk quick release unit described above, when the plurality of hard disks are inserted into the plurality of hard disk sockets, the two sides of the plurality of hard disks are accommodated in the fixed guiding groove and the hard disk quick release unit.

The advantages of the instant disclosure reside in that the hard disk replacement module does not need a replacement cartridge and is able to quickly insert the hard disk into the hard disk socket or exit the hard disk from the hard disk socket by the replacement unit, thereby simplifying the operation procedure for installing or replacing the hard disk by the hard disk replacement module and save time.

In order to further understand the techniques, means and effects of the instant disclosure, the following detailed descriptions and appended drawings are hereby referred to, such that, and through which, the purposes, features and aspects of the instant disclosure can be thoroughly and concretely appreciated; however, the appended drawings are merely provided for reference and illustration, without any intention to be used for limiting the instant disclosure.

BRIEF DESCRIPTION OF THE DRAWINGS

The accompanying drawings are included to provide a further understanding of the instant disclosure, and are incorporated in and constitute a part of this specification. The drawings illustrate exemplary embodiments of the instant disclosure and, together with the description, serve to explain the principles of the instant disclosure.

DESCRIPTION OF THE EXEMPLARY EMBODIMENTS

Figure 1:
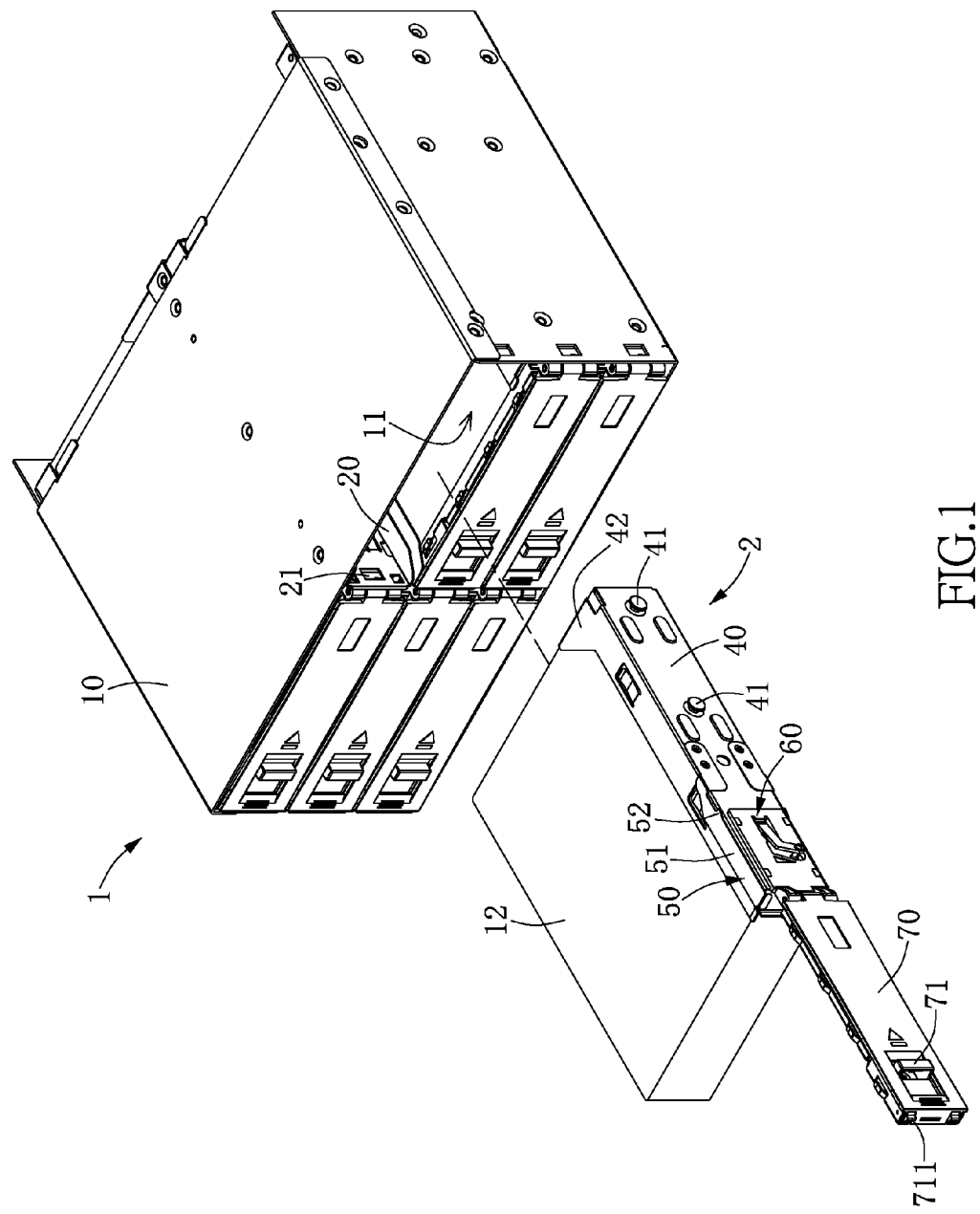
FIG. 1 is a three-dimensional assembly view of the hard disk replacement module of the instant disclosure taken from the front side.

Reference will now be made in detail to the exemplary embodiments of the instant disclosure, examples of which are illustrated in the accompanying drawings. Wherever possible, the same reference numbers are used in the drawings and the description to refer to the same or like parts.

Figure 2:
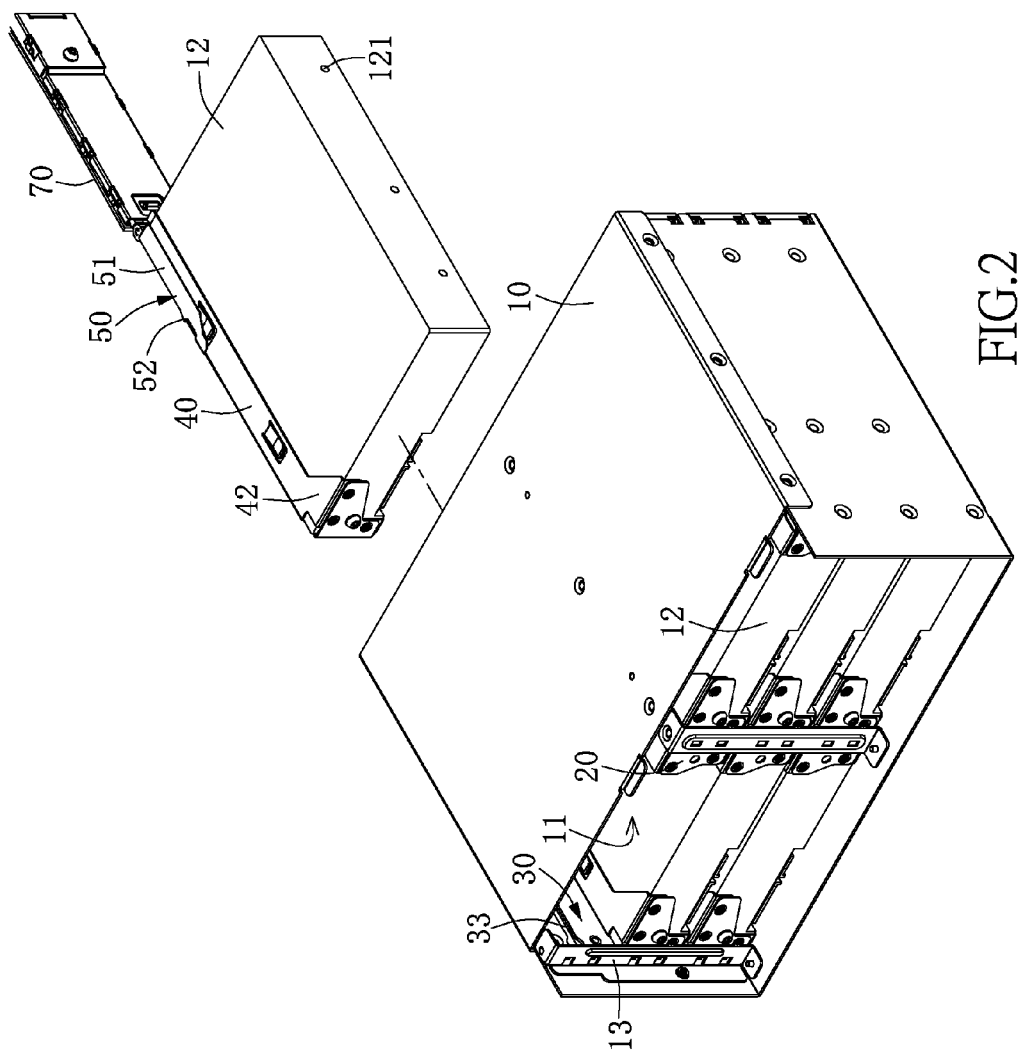
FIG. 2 is a three-dimensional assembly view of the hard disk replacement module of the instant disclosure taken from the rear side.
Figure 3:
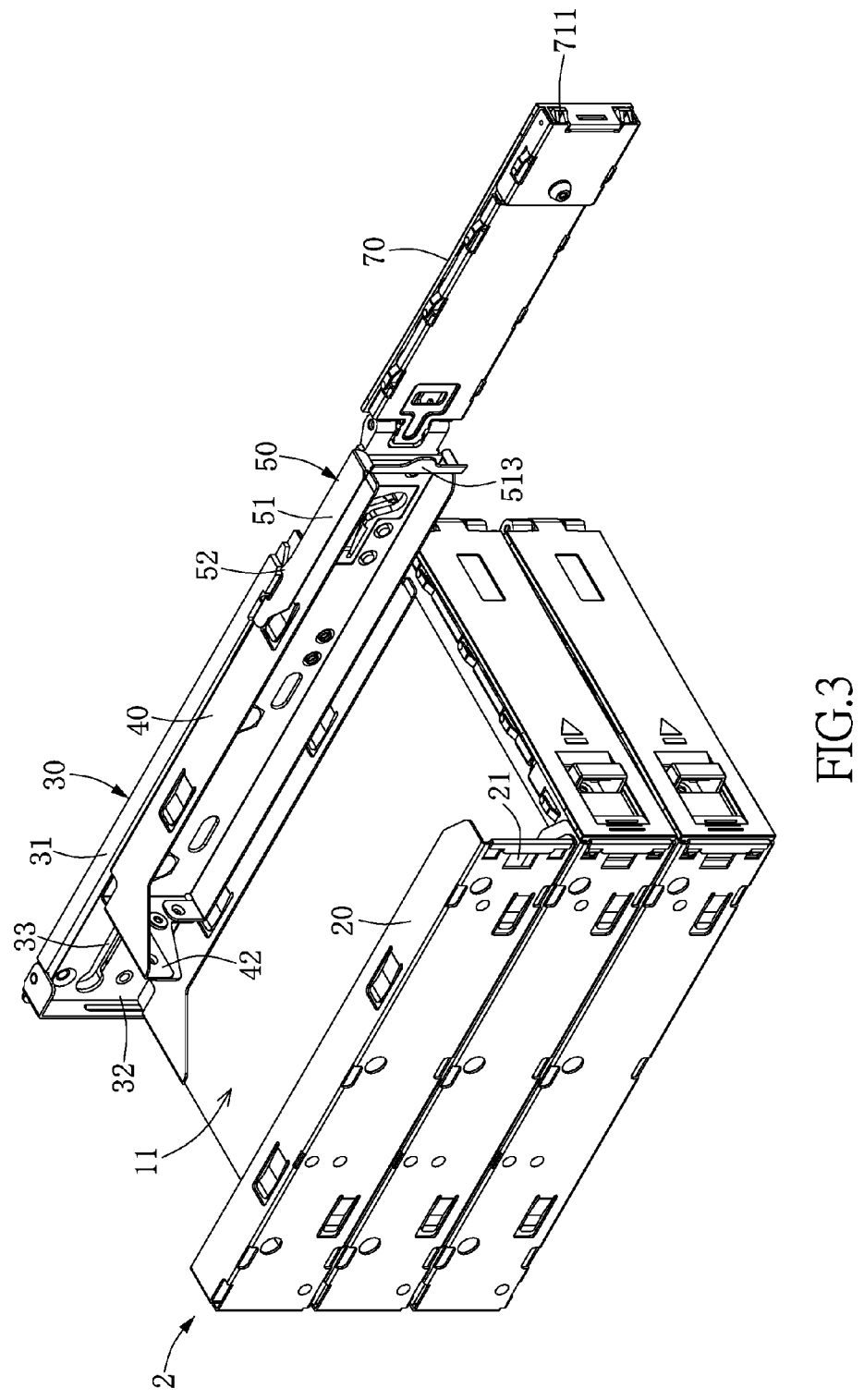
FIG. 3 is a three-dimensional assembly view of the hard disk replacement module of the instant disclosure eliminating the casing of the hard disk accommodating casing.

Please refer to FIG. 1 to FIG. 3. The instant disclosure relates to a hard disk quick release unit adapted to information devices such as servers, redundant array of independent disks (RAID), portable external hard drive box and network attached storage (NAS), and the replacement module thereof.

FIG. 1 and FIG. 2 show the structure of the hard disk replacement module 1 of the instant disclosure, the hard disk replacement module 1 of the instant disclosure comprises: a hard disk accommodating casing 10, the inner space of the hard disk accommodating casing 10 is divided into a plurality of hard disk sockets 11, each hard disk socket 11 may accommodate a hard disk 12, and a side of each hard disk socket 11 has a hard disk quick release unit 2 of the instant disclosure arranged thereon for quickly replacing the plurality of hard disks 12, and the hard disks 12 are installed in each hard disk socket 11 without the use of any screw.

Each hard disk socket 11 has an opening, the plurality of hard disks 12 may insert into the hard disk sockets 11 from the openings (as shown in FIG. 1). For the sake of description, the side of the hard disk socket 11 having an opening is defined as the front side, and the side opposite to the opening is defined as the rear side.

A side of each hard disk socket 11 has a fixed guide slot 20 arranged thereon, and the other side opposite to the fixed guide slot 20 has a hard disk quick release unit 2 arranged thereon, the two sides of the plurality of hard disks 12 are accommodated in the fixed guide slot 20 and the hard disk quick release unit 2 respectively, thereby installing the plurality of hard disks 12 in each of the hard disk socket 11.

FIG. 3 shows the structure of the hard disk replacement module 1 of the instant disclosure eliminating the casing of the hard disk accommodating casing 10. A plurality of fixed guide slots 20 are made from metal plates, and has a U-shape guiding groove formed at the inner side surface facing the hard disk 12. When the hard disks 12 are inserted into each hard disk socket 11, a side of each hard disk 12 adjacent to the fixed guide slot 20 is engaged into the inner side surface of each fixed guide slot 20.

Figure 4:
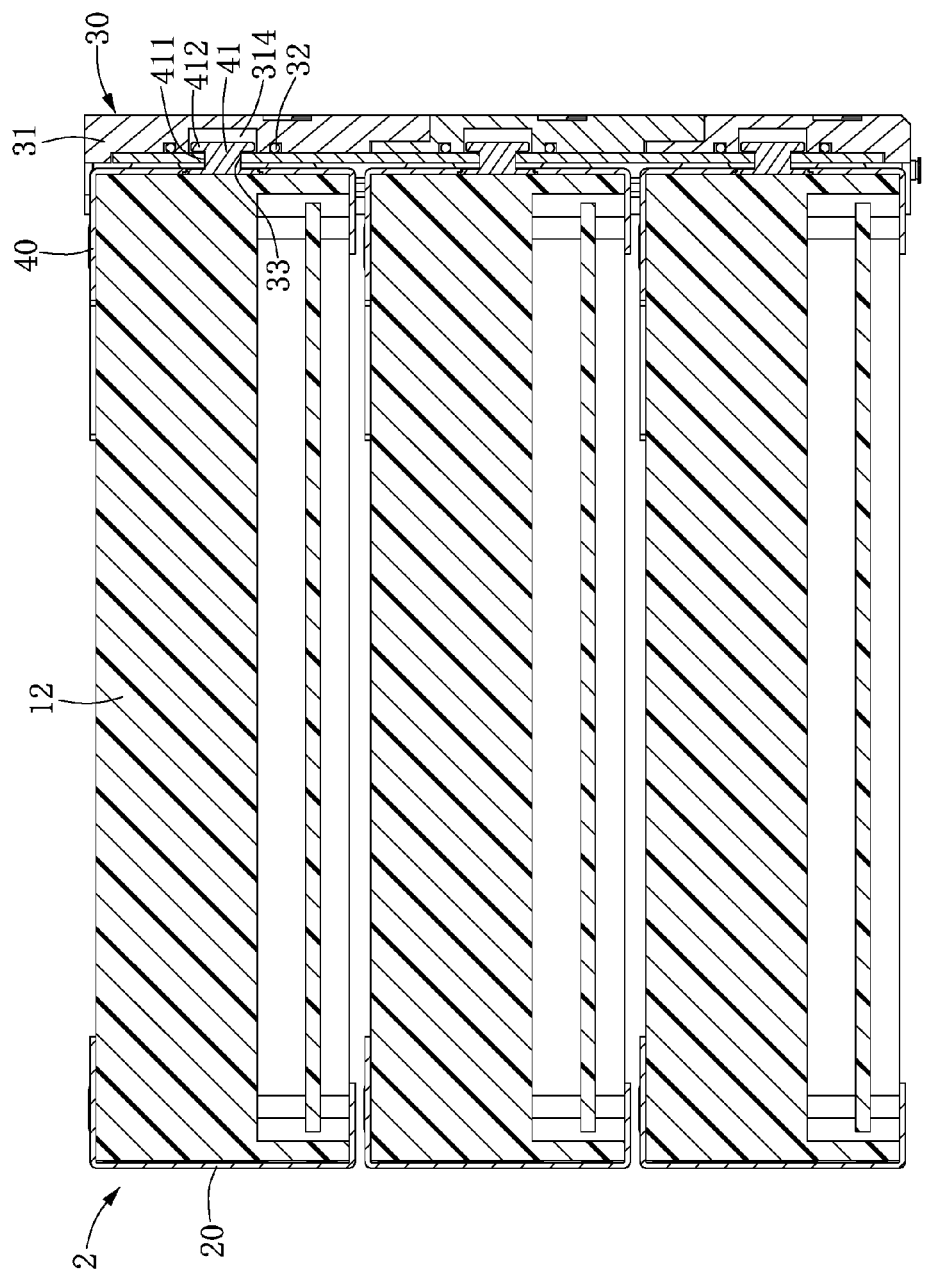
FIG. 4 is a sectional assembly view of the hard disk replacement module of the instant disclosure.
Figure 9:
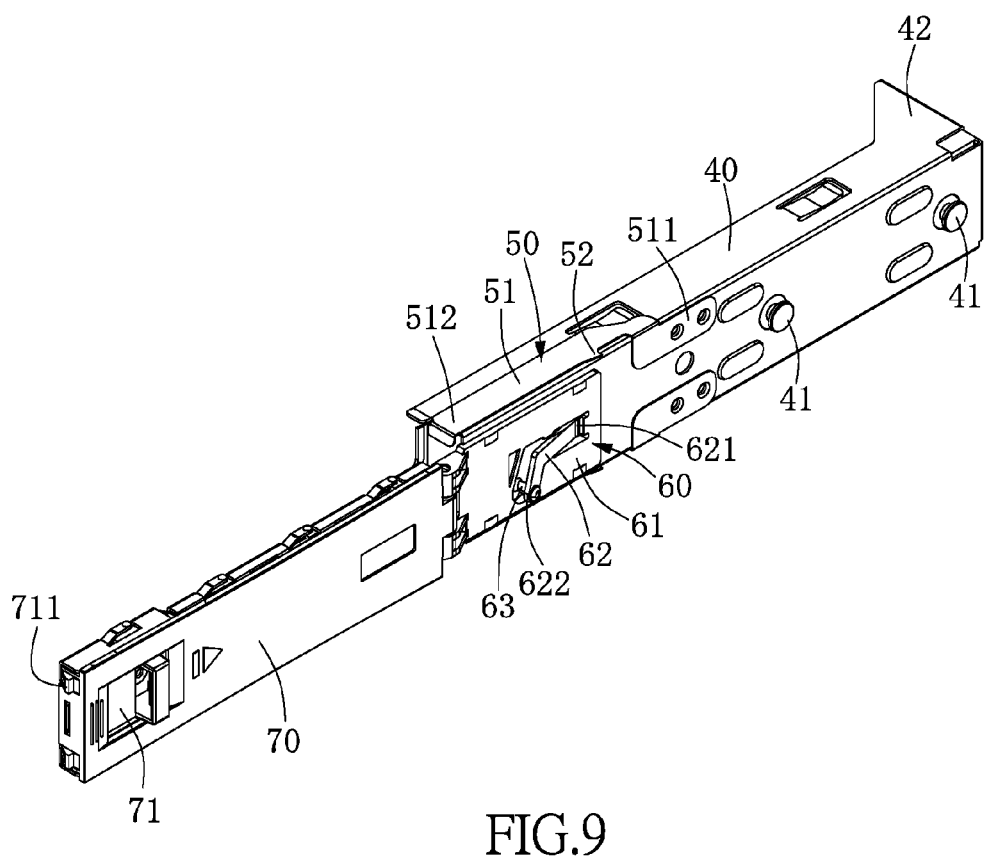
FIG. 9 is a three-dimensional assembly view of the slidable guiding groove employed in the instant disclosure.

As shown in FIG. 3 and FIG. 4, the hard disk quick release unit 2 is arranged on the side of the hard disk socket 11 opposite to the fixed guide slot 20. The hard disk quick release unit 2 comprises: at least a side fixing unit 30, the side fixing unit 30 is arranged on a side of the hard disk socket 11 opposite to the fixed guide slot 20, the side fixing unit 30 has at least a side fixing board 32 arranged thereon, and at least a restricting groove 33 is arranged on the side fixing board 32; and at least a slidable guiding frame 40, the slidable guiding frame 40 has an outer side surface and an inner side surface, the outer side surface of the slidable guiding frame 40 has at least a guiding member 41 arranged thereon, the guiding member 41 is slidably engaged into the restricting groove 33 for guiding the slidable guiding frame 40 by the restricting groove 33 to move back and forth in the hard disk socket 11 along a straight path; the inner side surface of the slidable guiding frame 40 forms a U-shape recess opposite to the fixed guide slot 20, the other side of the hard disk 12 opposite to the fixed guide slot 20 may be engaged into the recess at the inner side surface of the slidable guiding frame 40. As shown in FIG. 9, the end of the slidable guiding frame 40 has a back stopping board 42 vertical to the end of the slidable guiding frame 40 and extended toward the fixed guide slot 20. When a side of the hard disk 12 is inserted into the slidable guiding frame 40, the rear end of the hard disk 12 is engaged into a side of the slidable guiding frame 40 and contacts with the back stopping board 42. The front end of the slidable guiding frame 40 further has a resilient positioning member 50 and a cover board 70 arranged thereon, the cover board 70 is pivotally connected to the front end of the slidable guiding frame 40.

Figure 11:
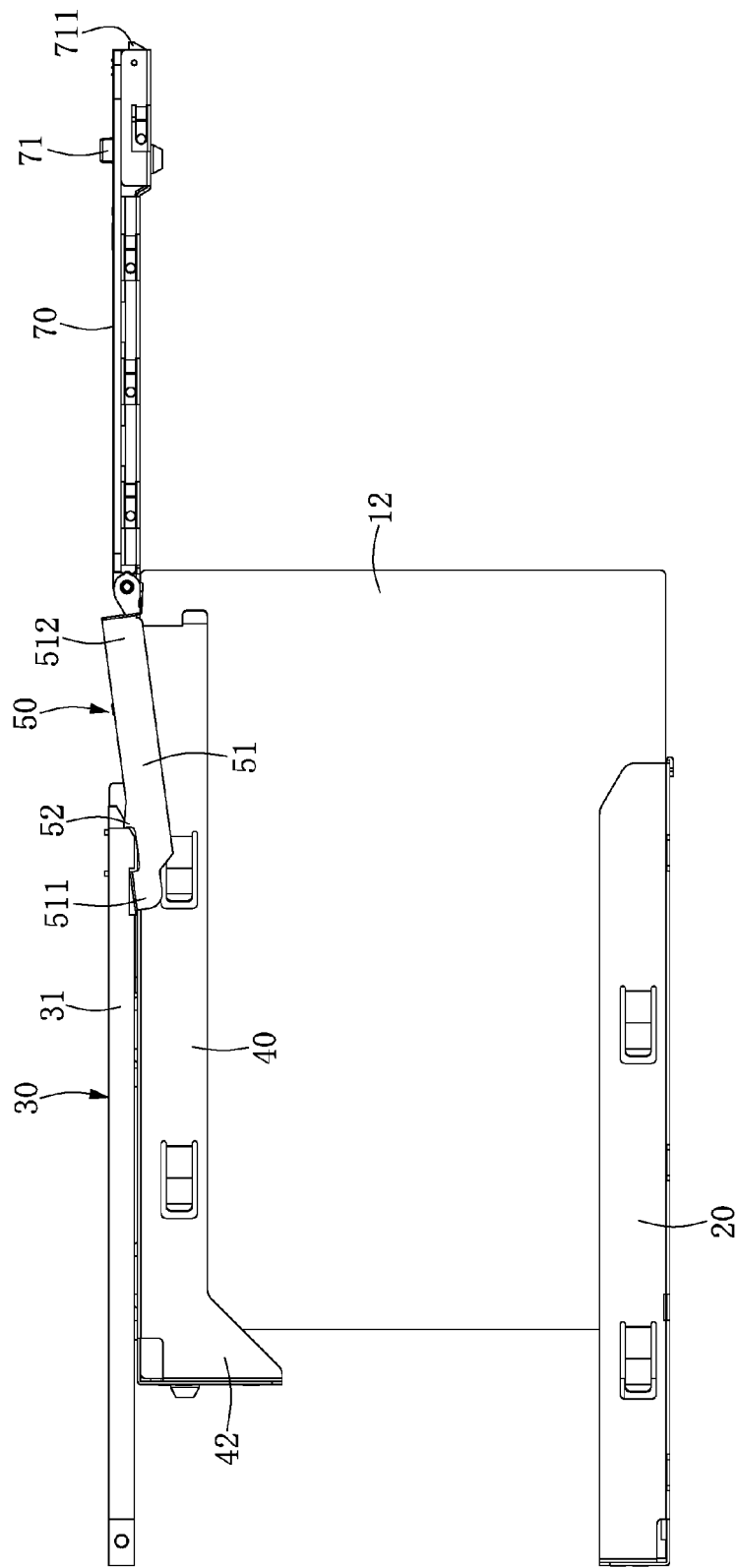
FIG. 11 is a top schematic view of the hard disk quick release unit when the slidable guiding groove and the hard disk are moved to an exit position, and the resilient positioning member is abutted by the hard disk and expanded outwardly.
Figure 12:
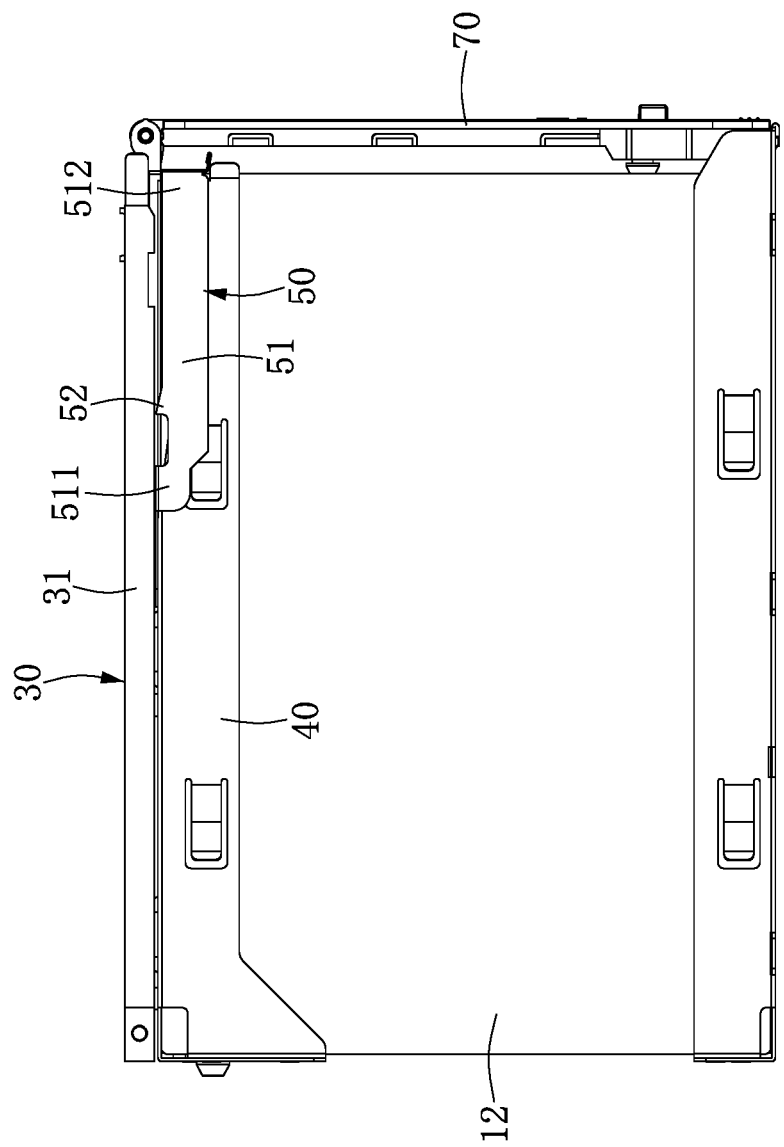
FIG. 12 is a top schematic view of the hard disk quick release unit when the slidable guiding groove and the hard disk are moved to an inserted position.

As shown in FIG. 11 and FIG. 12, the slidable guiding frame 40 may drive the hard disk 12 to move back and forth in the hard disk socket 11 along a straight path, and the slidable guiding frame 40 and the hard disk 12 may concurrently move back and forth between an exited position (as shown in FIG. 11) and an inserted position (as shown in FIG. 12). As shown in FIG. 12, when the slidable guiding frame 40 and the hard disk 12 is moved to the inserted position, each hard disk 12 may be completely accommodated in each hard disk socket 11, and each hard disk 12 may be connected to the hard disk connector (not shown) of the mother board or circuit board of the server or the storage device. In this circumstance, the cover board 70 may cover each opening of each hard disk socket 11 for protecting the hard disk 12 in each hard disk socket 11. As shown in FIG. 3 and FIG. 9, in the above embodiment, the end of the cover board 70 has a snap-fit element 71 arranged thereon, the snap-fit element 71 has a hook 711 protruding from the end of the cover board 70, when the cover board 70 covers each opening of the hard disk socket 11, the hook 711 of the snap-fit element 71 may engage into the snap-fit hole arranged on the front end of each fixed guide slot 20, thereby positioning the cover board 70 at the opening of each hard disk socket 11 for preventing the hard disk 12 from exiting from the opening of the hard disk socket 11.

As shown in FIG. 11, when the user intends to exit the hard disk 12 from the hard disk socket 11, the user may first pull at the snap-fit element 71 by his or her fingers to separate the hook 711 from the snap-fit hole and open the cover board 70. After the cover board 70 is opened, the cover board 70 may swing to a position parallel to the slidable guiding frame 40. At this time, the user may hold the cover board 70 and apply a force toward the exit direction of the hard disk 12 (the front side of the hard disk socket 11), thereby removing the slidable guiding frame 40 along with the hard disk 12 from the inserted position and moving the slidable guiding frame 40 along with the hard disk 12 to the exited position. When the hard disk 12 and the slidable guiding frame 40 are moved to the exited position, each hard disk 12 is separated from the connector of the substrate of the server or the storage device, and the front end of the hard disk 12 and the slidable guiding frame 40 protrude from the opening of the hard disk socket 11. Therefore, the user may directly remove the hard disk 12 from the hard disk socket 11.

FIG. 5 to FIG. 8 show the structure of the side fixing unit 30 employed in the hard disk quick release unit 2 of the instant disclosure. In the present embodiment, the side fixing unit 30 has a side fixing board 32 and a substrate 31, the side fixing board 32 is made from a metal plate and the substrate 31 is a plate made from aluminum alloy. A side of the substrate 31 corresponding to each hard disk socket 11 has a plurality of light guiding grooves 312 arranged thereon, and each light guiding groove 312 extends from the rear side of the substrate unit 311 to the front side of the substrate unit 311. Each light guiding groove 312 has a light guiding element 313 accommodated therein. The rear end of each light guiding groove 312 corresponds to a light source of a signal display device (not shown), the light generated by the light source of the signal display device is transmitted by the light guiding element 313 and is displayed at the front end of the substrate unit 311.

Figure 6:
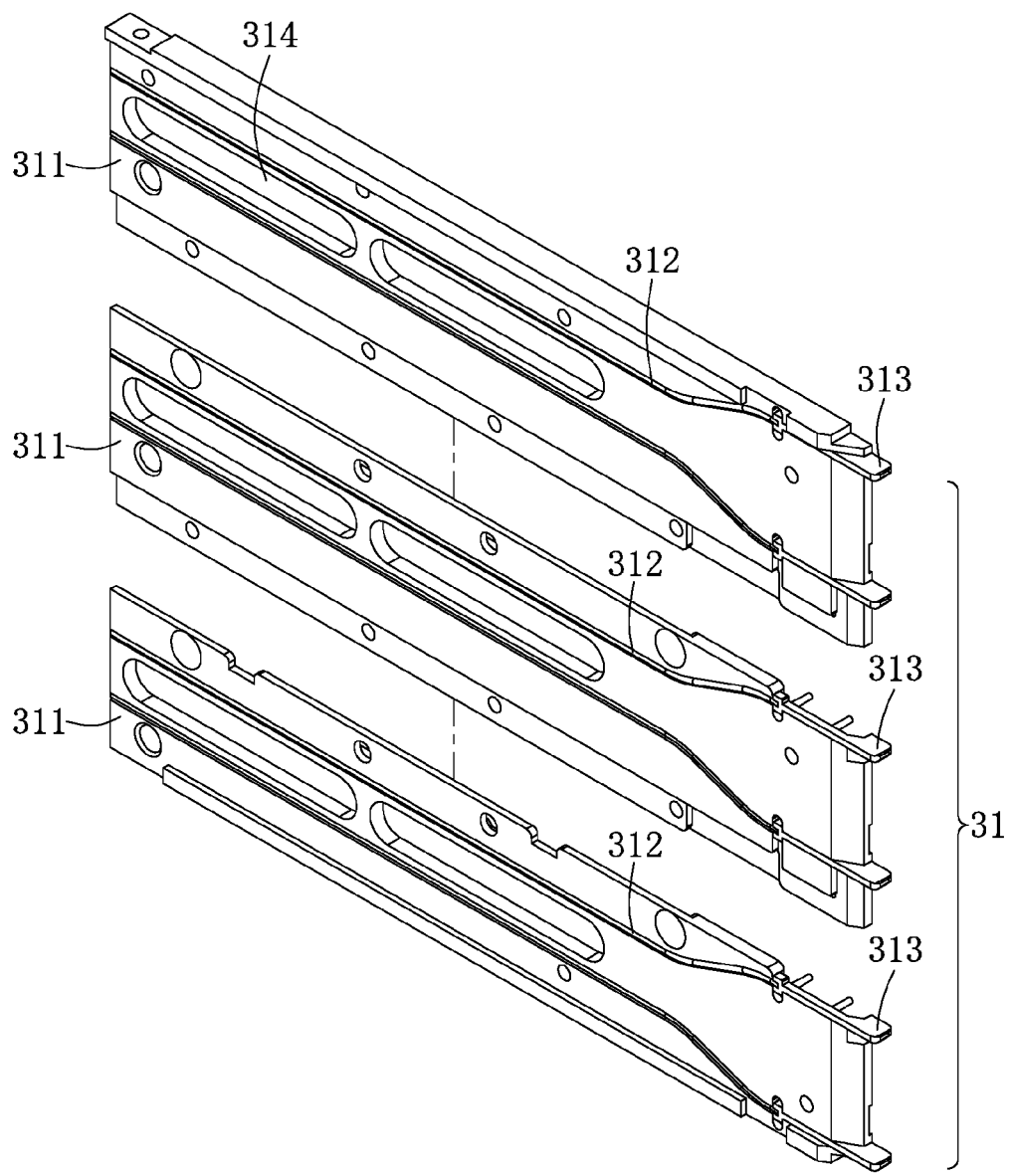
FIG. 6 is a three-dimensional exploded view of the substrate unit of the side fixing unit employed in the instant disclosure.
Figure 7:
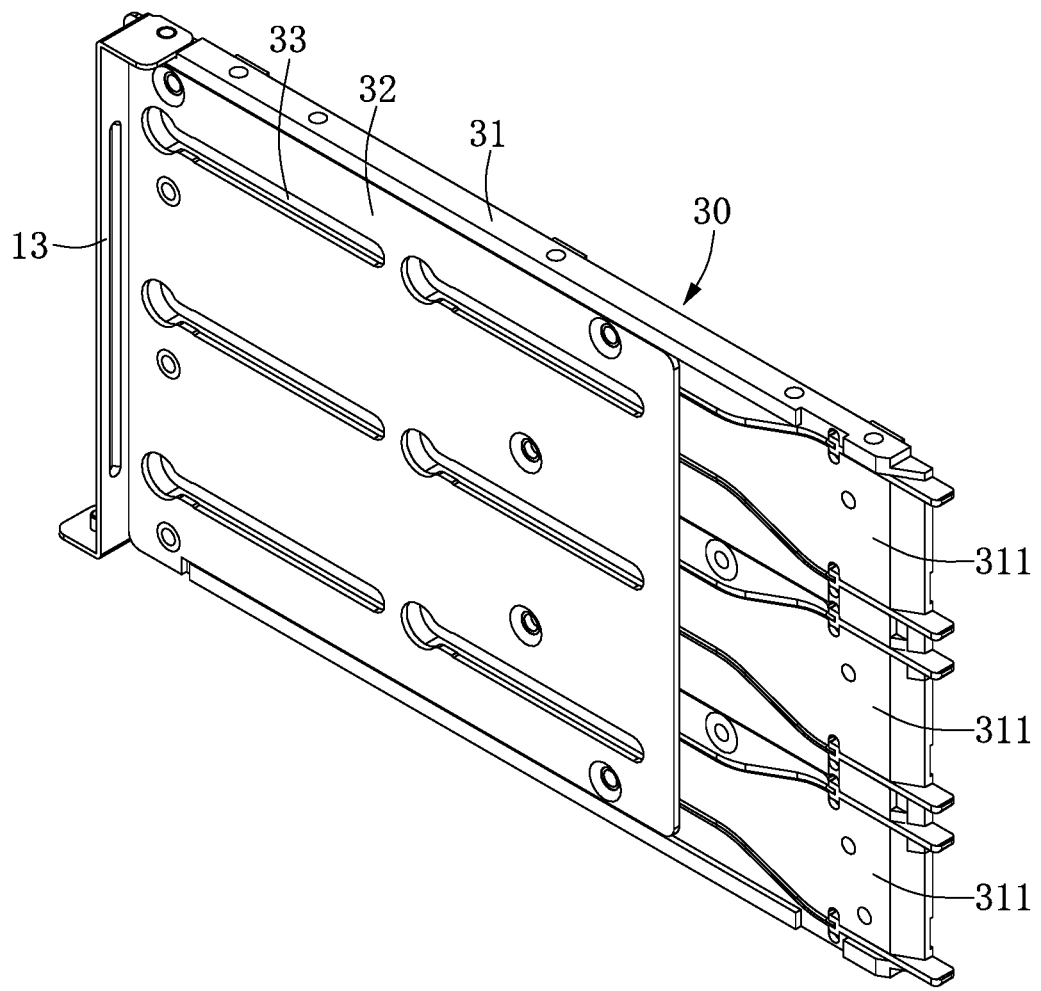
FIG. 7 is a three-dimensional assembly view of the side fixing unit employed in the instant disclosure.

As shown in FIG. 6, in order to expand or change the total height of the hard disk replacement module 1, the substrate 31 of the side fixing unit 30 of the instant disclosure may be designed as a combined structure. As shown in FIG. 4, FIG. 6 and FIG. 7, the substrate 31 of the present embodiment is constituted by the plurality of substrate units 311 stacking with each other. Meanwhile, the height of each substrate unit 311 is coordinated with the height of hard disk socket 11 and hence, when changing the number of the layers in each hard disk socket 11 in the hard disk accommodating casing 10, it is able to produce the substrate 31 coordinated with the hard disk accommodating casing 10 having different height by increasing the number of the substrate 31. The substrate 31 may also be designed as a one-piece structure and is not limited to the combined structure shown in the figures.

In the above embodiment, the adjacent edges of a plurality of substrate units 311 are arranged in a stepped shape and hence, the adjacent edges of two adjacent substrate units 311 may be connected to each other. The plurality of light guiding grooves 312 and light guiding elements 313 are arranged on the plurality of substrate units 311, and two light guiding grooves 312 are arranged on each substrate unit 311. The two light guiding grooves 312 are used for displaying the light source of the operation light and the fault light of the hard disk 12 accommodated in each hard disk socket 11, thereby contributing to the system maintenance. In addition, the inner side surface of each substrate unit 311 corresponding to the guiding member 41 has an accommodating groove 314 arranged thereon for receiving the end of the guiding member 41 and preventing the guiding member 41 from interfering with the substrate 31 upon moving.

Figure 8:
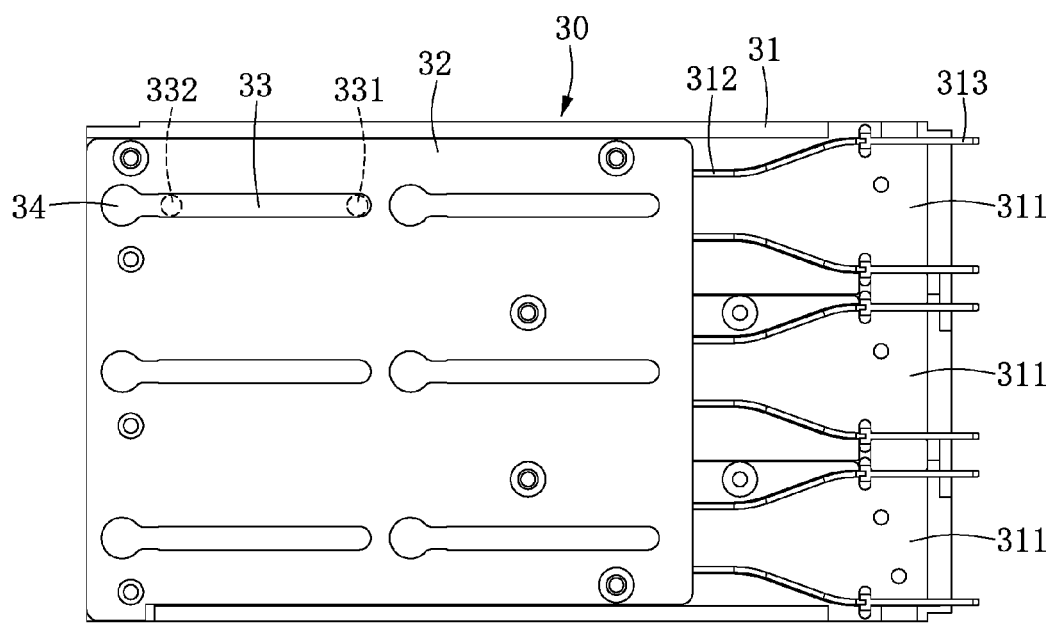
FIG. 8 is the side view of the side fixing unit employed in the instant disclosure.

As shown in FIG. 4, FIG. 7 and FIG. 8, when each substrate unit 311 are assembled, the side fixing board 32 is fixed on the inner side surface of each substrate unit 311 by screws, thereby forming a complete substrate 31 using the individual substrate units 311. As shown in FIG. 8 and FIG. 9, the shape of the restricting grooves 33 arranged on the side fixing board 32 is a slim groove parallel to the straight path in the slidable guiding frame 40 of the hard disk socket 11, and the rear end of each restricting groove 33 further connects to an exit hole 34 having a diameter larger than the width of the restricting groove 33. Please refer to FIG. 4, the guiding member 41 at the outer surface of the slidable guiding frame 40 has a guiding pillar 411 and an engagement end 412 arranged on the end of the guiding pillar 411, wherein the diameter of the guiding pillar 411 is smaller than the width of the restricting groove 33 and hence, the guiding pillar 411 may move back and forth in the restricting groove 33. The diameter of the engagement end 412 is larger than the width of the restricting groove 33 and smaller than the diameter of the exit hole 34, and the distance between the inner side surface of the engagement end 412 and the outer side surface of the slidable guiding frame 40 is larger than the thickness of the side fixing board 32. Therefore, when the slidable guiding frame 40 is assembled on the side fixing unit 30, the engagement end 412 of each guiding member 41 may be inserted through the exit hole 34, the engagement end 412 may be inserted into the inner side surface of the side fixing board 32 and the guiding pillar 411 is pushed and engaged into the restricting groove 33 for sliding in the restricting groove 33. The engagement end 412 is limited by the restricting groove 33 and is unable to exit and hence, the guiding member 41 is guided and limited by each restricting groove 33, thereby limiting the slidable guiding frame 40 at the inner side surface of the side fixing unit 30.

As shown in FIG. 8, the front end and the rear end of each restricting groove 33 has a first fixed position 331 and a second fixed position 332 respectively, wherein the first fixed position 331 is adjacent to the front end of the restricting groove 33, and when the slidable guiding frame 40 and the hard disk 12 are moved to the exited position, each guiding member 41 may be moved to the first fixed position 331 of the restricting groove 33, and when the slidable guiding frame 40 and the hard disk 12 are moved to the inserted position, each guiding member 41 may be moved to the second fixed position 332 of the restricting groove 33.

In addition, the center position of the exit hole 34 of each restricting groove 33 is offset from the second fixed position 332 of the restricting groove 33 toward the rear direction of the hard disk socket 11, and the offset distance of the exit hole 34 from the second fixed position 332 of the restricting groove 33 is larger than the diameter of the guiding pillar 411 of the guiding member 41. Therefore, when the slidable guiding frame 40 is moved to the inserted position, each guiding pillar 411 may remain engaged in the restricting groove 33, thereby preventing the guiding member 41 detaching from the restricting groove 33.

Figure 5:
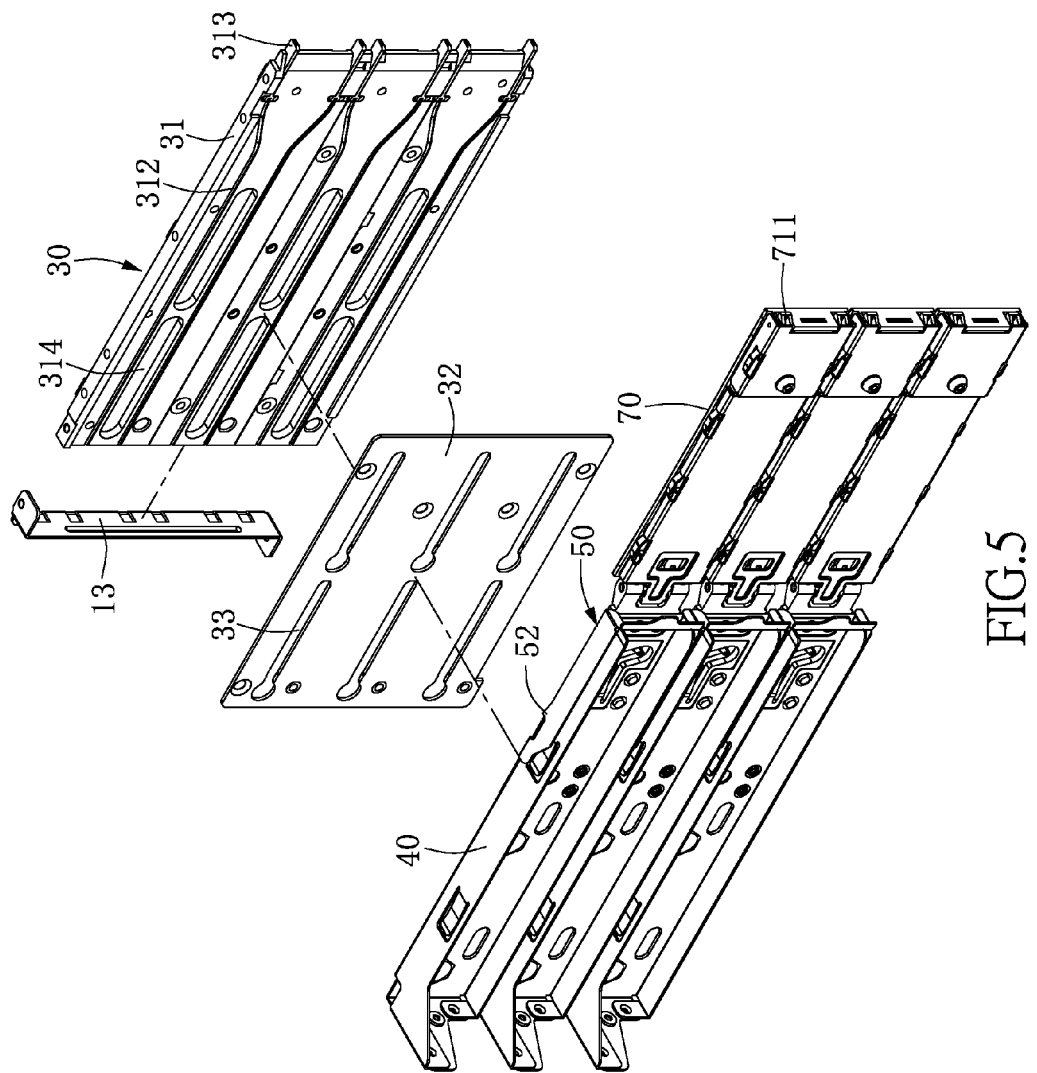
FIG. 5 is a three-dimensional exploded view of the hard disk quick release unit employed in the instant disclosure.

In addition, the rear side of the hard disk accommodating casing 10 of the instant disclosure further has a stopper member 13 arranged thereon. As shown in FIG. 2 and FIG. 5, the stopper member 13 is removably arranged on the rear side of the hard disk socket 11, the stopper member 13 is positioned at the rear side of each slidable guiding frame 40, and when each slidable guiding frame 40 is moved to the inserted position, the stopper member 13 may abut the rear end of each slidable guiding frame 40 to prevent the slidable guiding frame 40 from continuing to move toward the rear side of the hard disk socket 11 after arriving at the inserted position, thereby preventing each guiding member 41 from sliding into the exit hole 34.

By employing the stopper member 13, the guiding member 41 of each slidable guiding frame 40 is unable to move to the position of the exit hole 34 and may remain in the restricting groove 33 without separating with the side fixing unit 30. At the same time, the stopper member 13 is quickly removable and hence, when one of the slidable guiding frames 40 of the hard disk quick release unit 2 is damaged, the user only need to remove the stopper member 13 and push the damaged slidable guiding frame 40 toward the rear side of the hard disk socket 11 for engaging the guiding member 41 in the exit hole 34, and exit the engagement end 412 of the guiding member 41 through the exit hole 34. Therefore, it is able to remove the damaged slidable guiding frame 40 from the side fixing unit 30 and replace it with a new slidable guiding frame 40.

The slidable guiding frame 40 of the instant disclosure further has a resilient positioning member 50 arranged on the front end, when the slidable guiding frame 40 is moved to the exited position, the slidable guiding frame 40 remains at the exited position by the resilient positioning member 50 for the user to insert the hard disk 12 into the slidable guiding frame 40.

Figure 10:
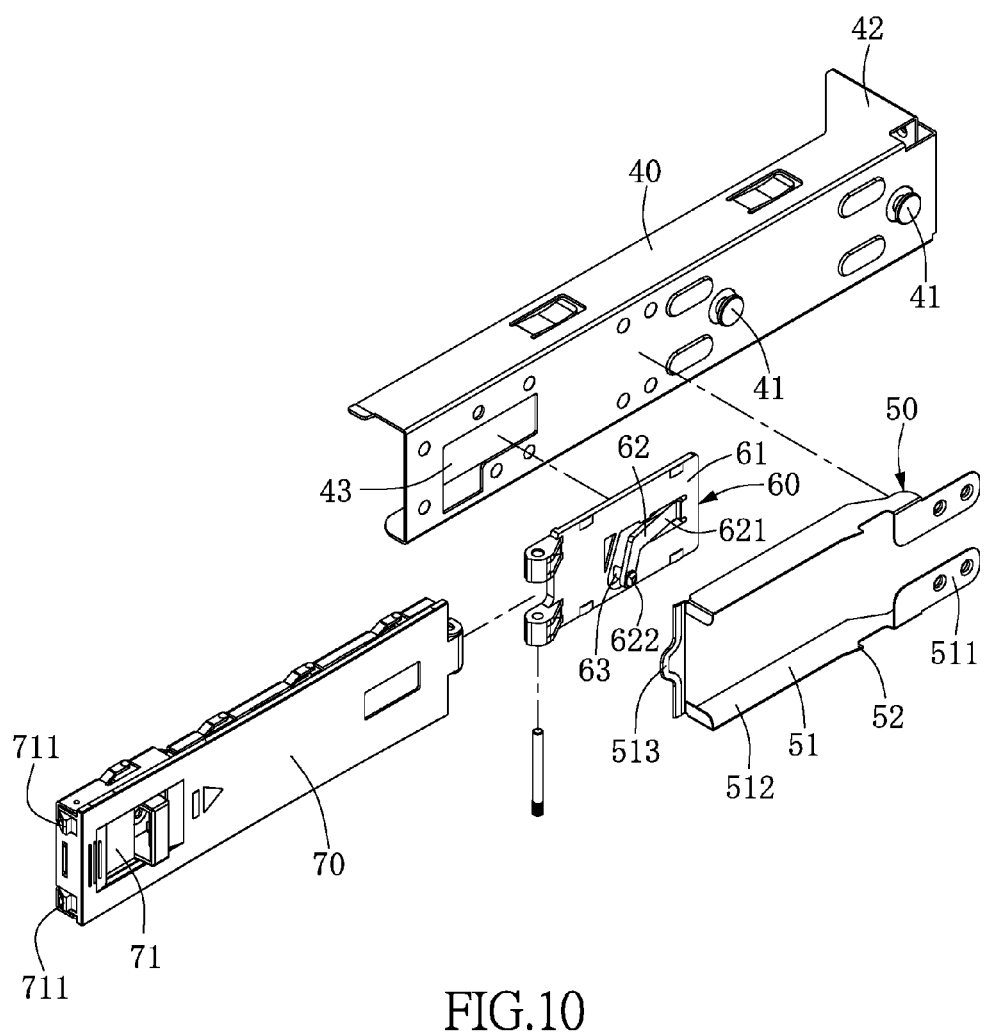
FIG. 10 is a three-dimensional exploded view of the slidable guiding groove employed in the instant disclosure.

As shown in FIG. 9 and FIG. 10, the resilient positioning member 50 comprises an elastic member 51 and an engagement positioning portion 52 arranged on the elastic member 51. The elastic member 51 is a spring-rebound plate, the engagement positioning portion 52 protrudingly arranged on the outer edge of the elastic member 51. The elastic member 51 may be pulled by the user or may be abutted by the side surface of the hard disk 12 inserted into the inner side of the slidable guiding frame 40 and expand outwardly from the slidable guiding frame 40, thereby enabling the engagement positioning portion 52 to remain protruding from the outer surface of the slidable guiding frame 40.

As shown in FIG. 10, the elastic member 51 is a spring plate made of a metal plate, and an end of the elastic member 51 is a connection end 511. In the above embodiment, the connection end 511 is connected to the outer side surface of the slidable guiding frame 40 in a riveting manner; the end of the elastic member 51 opposite to the connection end 511 comprises two extension portions 512, the two extension portions 512 are immediately overlaid on the upper side surface and the lower side surface of the slidable guiding frame 40 respectively. When the elastic member 51 is movable, the extension portion 512 may be pulled and moves toward the outer side surface of the slidable guiding frame 40, and the engagement positioning portion 52 is arranged on the outer side edge of the extension portions 512.

As shown in FIG. 11 and FIG. 12, when the slidable guiding frame 40 is moved to the exited position and the elastic member 51 is expanded outwardly, the position of the engagement positioning portion 52 enables the plurality of engagement positioning portions 52 to be driven by the elastic member 51 and engaged on the front edge of the side fixing unit 30 (as shown in FIG. 11). The elastic member 51 may be pulled by the user's finger or may be abutted by the hard disk 12 and expend outwardly. However, when there is no force applied on the elastic member 51, the elastic member 51 may go back to the original position by its own resilience and drive the engagement positioning portion 52 to move to a position that will not interfere with the side fixing unit 30 (as shown in FIG. 12).

As shown in FIG. 3 and FIG. 10, the end of the two extension portions 512 of the elastic member 51 has a connection portion 513. The connection portion 513 is connected between the ends of the two extension portions 512. As shown in FIG. 3, after the resilient positioning member 50 is assembled on the slidable guiding frame 40, the connection portion 513 will be positioned on the inner side surface of the pivot end of the cover board 70. In addition, as shown in FIG. 11, when the slidable guiding frame 40 is positioned at the exited position, during the procedure of inserting the hard disk 12 into the inner side of the slidable guiding frame 40 conducted by the user, a side of the hard disk 12 adjacent to the slidable guiding frame 40 may abut the connection portion 513 toward the outer side of the slidable guiding frame 40 and expand the elastic member 51 outwardly and drive the engagement positioning portion 52 to engage on the front end of the side fixing unit 30 for preventing the slidable guiding frame 40 backing into the hard disk socket 11. Therefore, the user may insert the hard disk 12 into the slidable guiding frame 40 easily.

As shown in FIG. 12, when the hard disk 12 is completely inserted into the slidable guiding frame 40 and after the connection portion 513 detaches with the side surface of the hard disk 12, the connection portion 513 is no longer limited by the hard disk 12 and the elastic member 51 is returned to the original position. Therefore, the engagement positioning portion 52 moves to the inner side of the side fixing unit 30 and the slidable guiding frame 40 may move to the inserted position without any limitation (as shown in FIG. 12).

In order to achieve the goal of fixing the hard disk 12 in the slidable guiding frame 40 without the use of any screw, the front side of the slidable guiding frame 40 of the instant disclosure further has a hard disk engagement member 60 arranged thereon. In the above embodiment, the hard disk engagement member 60 is formed into a one-piece structure by plastic injection molding. The hard disk engagement member 60 comprises: a fixed housing 61, the fixed housing 61 is fixed on the front end of the slidable guiding frame 40, the rear end of the hard disk engagement member 60 is pivotally connected to the front end of the fixed housing 61 and connected to the front end of the slidable guiding frame 40 through the fixed housing 61; a resilient arm 62, the fixed housing 61 has a hollow portion, the resilient arm 62 is extended from a side of the hollow portion of the fixed housing 61, the resilient arm 62 has a fixed end 621 and an active end 622, the fixed end 621 is connected to the fixed housing 61, the active end 622 is extended obliquely toward the front end of the slidable guiding frame 40 and away from the outer side surface of the slidable guiding frame 40; and a lock pin 63, the lock pin 63 is integrally formed on the inner side of the active end 622 of the resilient arm 62, and the lock pin 63 is corresponded to a fixed tapped hole 121 on the side surface of the hard disk 12 (as shown in FIG. 2).

As shown in FIG. 10, the side surface of the slidable guiding frame 40 corresponding to the lock pin 63 has a notch portion 43 arranged thereon, and the lock pin 63 may pass through the notch portion 43 and reach the inner side surface of the slidable guiding frame 40 from the outer side of the slidable guiding frame 40.

When the slidable guiding frame 40 is moved to the exited position, the resilient arm 62 is positioned at the outer side of the hard disk socket 11 and hence, the resilient arm 62 is not limited by the sidewall of the hard disk socket 11 (in the present embodiment, the sidewall of the hard disk socket 11 is the inner side surface of the side fixing unit 30), and the resilient arm 62 remains expanded outwardly. At this time, the lock pin 63 detaches from the fixed tapped hole 121 of the hard disk 12. However, as shown in FIG. 11 and FIG. 12, when the hard disk 12 and the slidable guiding frame 40 are inserted into the inserted position of the hard disk socket 11, the outer side of the resilient arm 62 is abutted by the sidewall of the hard disk socket 11 and moved toward the hard disk 12, thereby driving the resilient arm 62 to engage into the fixed tapped hole 121 and the hard disk 12 is fixed in the hard disk socket 11.

Figure 13:
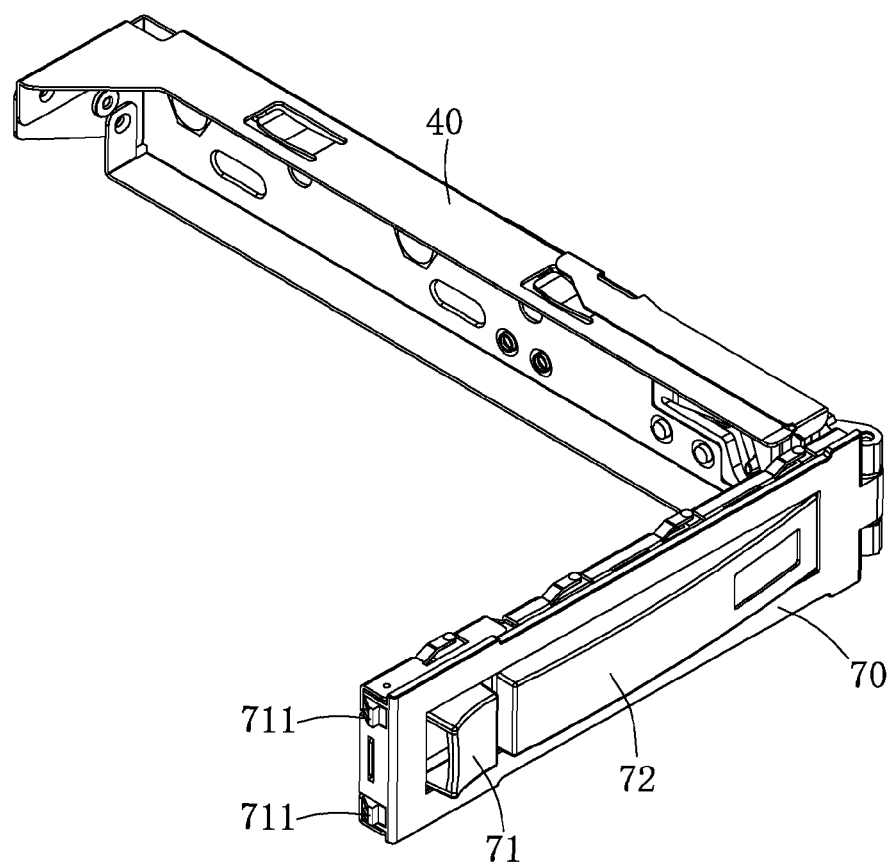
FIG. 13 is a three-dimensional assembly view of another embodiment of the slidable guiding groove employed in the instant disclosure.

FIG. 13 shows another embodiment of the slidable guiding frame 40 employed in the hard disk quick release unit 2 of the instant disclosure. In the present embodiment, the outer side surface of the cover board 70 arranged on the front end of the slidable guiding frame 40 has a protruding portion 72 having an elongated shape and a curved surface. The protruding portion 72 provides the function of decoration of the outer surface of the cover board 70, and by holding the protruding portion 72 of the cover board 70, the user may drive the slidable guiding frame 40 and hard disk 12 to exit from the hard disk socket 11.

[Effectiveness Provided by the Embodiments]

In summary, the advantages of the instant disclosure reside in that by directly installing a plurality of hard disks 12 into each hard disk socket 11 through the hard disk quick release unit 2, the hard disk replacement module 1 employed by the instant disclosure eliminates the need of a hard disk replacement cartridge used in the prior art. Therefore, when there is a need for installing or replacing the hard disk 12, the user may directly insert the hard disk 12 into the hard disk socket 11 or directly remove the hard disk 12 from the hard disk socket 11 without installing the hard disk 12 in the replacement cartridge or removing the hard disk 12 from the replacement cartridge. Accordingly, the procedure for replacing the hard disk 12 is significantly simplified and saving plenty of times.

Moreover, in the instant disclosure, since each hard disk quick release unit 2 is individually arranged on a side of the hard disk socket 11 through the slidable guiding frame 40, the hard disk quick release units 2 may be quickly removed from the hard disk socket 11. Therefore, when malfunctions have occurred on the hard disk quick release unit 2, the hard disk quick release unit 2 is able to quickly removed and replaced with a new one. Accordingly, the hard disk quick release unit 2 of the instant disclosure is easy for maintenance and service.

In addition, since the front end of the slidable guiding frame 40 of the instant disclosure has a resilient positioning member 50, the resilient positioning member 50 may be used to limit the slidable guiding frame 40 at the exited position for the user to replace the hard disk 12. The front end of each slidable guiding frame 40 further has a hard disk engagement member 60 arranged thereon and hence, it is able to achieve the goal of installing the hard disk 12 in the inner side surface of the slidable guiding frame 40 without the use of screws. Therefore, the replacement of the hard disk 12 is easier and more effective.

The above-mentioned descriptions represent merely the exemplary embodiment of the present disclosure, without any intention to limit the scope of the instant disclosure thereto. Various equivalent changes, alterations or modifications based on the claims of the instant disclosure are all consequently viewed as being embraced by the scope of the instant disclosure.

What is claimed is:

1. A hard disk quick release unit for installing a hard disk in a hard disk socket, the hard disk is quickly replaceable, the hard disk socket has an opening, the hard disk socket has a front side at which the opening is arranged and a rear side opposite to the opening, the hard disk quick release unit comprises:
   at least a side fixing unit, the side fixing unit is arranged on a side of the hard disk socket and has at least a restricting groove arranged thereon;
   a slidable guiding groove, the slidable guiding groove has an outer side surface and an inner side surface, the outer side surface of the slidable guiding groove is adjacent to the side fixing unit, the outer side surface of the slidable guiding groove has at least a guiding member arranged thereon, the a guiding member is slidably engaged into the restricting groove, a side of the hard disk facing the slidable guiding groove is configured to engage into the inner side of the slidable guiding groove, the slidable guiding groove is guided by the restricting groove of the side fixing unit to move back and forth between an exited position and an inserted position along a straight path;
   a cover board, the cover board is pivotally connected to the front end of the slidable guiding groove, when the slidable guiding groove is moved to the inserted position along with the hard disk, the cover board covers the opening of the hard disk socket; and
   a resilient positioning member, the resilient positioning member is arranged on the front end of the slidable guiding groove, the resilient positioning member has a resilient member and an engagement positioning portion, wherein the engagement positioning portion is protudingly arranged on the outer side surface of the resilient member, when the slidable guiding groove is moved to the exited position, the engagement positioning portion is driven by the resilient member and engaged to the front edge of the side fixing unit.

2. The hard disk quick release unit according to claim 1, wherein an end of the resilient member of the resilient positioning member is a connection end, the connection end is connected to the outer side surface of the slidable guiding groove; the end of the resilient member opposite to the connection end is an extension portion, the extension portion is immediately overlaid on the upper side surface or the lower side surface of the slidable guiding groove, the engagement positioning portion is arranged on the outer edge of the resilient member, and the extension portion of the resilient member is configured to be pulled to move toward the outer side surface of the slidable guiding groove.

3. The hard disk quick release unit according to claim 2, wherein:
   the side fixing unit has at least a substrate and a side fixing board arranged on the side surface of the substrate, a side surface of the substrate has at least a light guiding groove arranged thereon, the light guiding groove has a guiding element accommodated therein;
   the restricting groove is arranged on the side fixing board, and the front end and the rear end of the restricting groove has a first position and a second position respectively, when the slidable guiding groove is moved to the inserted position, the guiding member is moved to the second position of the restricting groove;
   the rear end of the restricting groove is connected to an exit hole, the diameter of the exit hole is larger than the width of the restricting groove, and the center position of the exit hole is positioned at a position which is offset from the second position of the restricting groove toward the rear side of the hard disk socket for a predetermined distance;

the guiding member has a guiding pillar and an engagement end arranged on the end of the guiding pillar, the diameter of the guiding pillar is smaller than the width of the restricting groove, the diameter of the engagement end is larger than the width of the restricting groove and smaller than the diameter of the exit hole, and when the guiding member is engaged into the restricting groove, the engagement end is positioned at the outer side of the side fixing board; and the hard disk quick release unit further comprises a stopper member, the stopper member is removably arranged on the rear side of the hard disk socket, when the slidable guiding groove is moved to the inserted position, the stopper member abuts the rear end of the slidable guiding groove to prevent the slidable guiding groove from continuing to move toward the hard disk socket after arriving at the inserted position.

4. The hard disk quick release unit according to claim 3, wherein the front end of the slidable guiding groove further has a hard disk engagement member arranged thereon, the hard disk engagement member comprises:

a resilient arm, the resilient arm has a fixed end and an active end, the fixed end is connected to the side surface of the slidable guiding groove, the active end obliquely extends toward the front end of the slidable guiding groove and away from the outer side surface of the slidable guiding groove; and a lock pin, the lock pin is arranged at the inner side of the active end of the resilient arm, and the position of the lock pin is corresponded to the position of a fixing tapped hole at the side surface of the hard disk;

wherein the side surface of the slidable guiding groove corresponding to the lock pin has a notch portion arranged thereon, the lock pin is configured to pass through the notch portion from the outer of the slidable guiding groove and reach the inner side surface of the slidable guiding groove;

wherein when the slidable guiding groove is moved to the exit position, the lock pin of the hard disk engagement member is driven by the resilient arm and separated from the fixing tapered hole, and when the slidable guiding groove is moved toward the inserted position, the outer side surface of the resilient arm is abutted by the inner side surface of the side fixing unit, the resilient arm moves toward the hard disk and the lock pin is engaged into the fixing tapered hole.

5. A hard disk replacement module, comprising:

a hard disk accommodating casing in which a plurality of hard disk sockets are formed, each hard disk socket has an opening for inserting a plurality of hard disks into the plurality of hard disk sockets, the hard disk socket has a front side at which the opening is arranged and a rear side opposite to the opening, wherein the two sides of each hard disk socket has a fixed guiding groove and a hard disk quick release unit arranged thereon respectively, when the plurality of hard disks are inserted into the plurality of hard disk sockets, the two sides of each hard disk socket are accommodated in the fixed guiding groove and the hard disk quick release unit respectively, wherein each hard disk quick release unit comprises at least a side fixing unit and a plurality of slidable guiding grooves, the side fixing unit has a plurality of restricting grooves arranged thereon, each restricting groove has an outer side surface and an inner side surface, the outer side surface of the slidable guiding groove has at least a guiding member arranged thereon, the guiding member is slidably engaged into the restricting groove, a side of the hard disk facing the slidable guiding groove is configured to engage into the inner side of the slidable guiding groove, the slidable guiding groove is guided by the plurality of restricting grooves of the side fixing unit and is moved back and forth between an exited position and an inserted position along a straight path;

a plurality of cover boards, the plurality of cover boards are pivotally connected with the front ends of the plurality of slidable guiding grooves respectively, an end of each cover board adjacent to the fixed guiding groove has a snap-fit element, when the plurality of slidable guiding grooves are moved to the inserted position along with the hard disks, the snap-fit elements are engaged with the front ends of the plurality of fixed guiding grooves for enabling the plurality of cover boards to cover the openings of the plurality of hard disk sockets; and a plurality of resilient positioning members, the plurality of resilient positioning members are arranged on the front ends of the plurality of sidable guiding grooves, each resilient positioning member has a resilient member and an engagement positioning portion, wherein the engagement positioning portion is protrudingly arranged on the outer side surface of the resilient member, when the slidable guiding groove is moved to the exited position and the resilient member is expanded toward the outer side of the slidable guiding groove, the position of the engagement positioning portion enables the engagement positioning portion to be exposed from the outer side of the hard disk socket and to engage with the front edge of the side fixing unit.

6. The hard disk replacement module according to claim 5, wherein the resilient member of the resilient positioning member comprises:

a connection end, the connection end is connected to the outer side surface of the slidable guiding groove; and an extension portion, the extension portion is immediately overlaid on the upper side surface or the lower side surface of the slidable guiding groove, an end of the extension portion is connected to an end of the connection end, the end of the extension portion opposite to the connection end is a free end, the free end obliquely extends away from the outer side surface of the slidable guiding groove into the front end of the slidable guiding groove, and the engagement positioning portion is arranged on the outer edge of the extension portion.

7. The hard disk replacement module according to claim 6, further comprising:

at least a side fixing board arranged on the side fixing unit;

a plurality of restricting grooves arranged on the side fixing board, and the front end and the rear end of each restricting grooves has a first position and a second position respectively, when the plurality of slidable guiding grooves are moved to the inserted position, the plurality of guiding members are moved to the second position of the restricting grooves; and a stopper member, the stopper member is removably arranged on the rear side of the hard disk socket in the hard disk accommodating casing, when the plurality of slidable guiding grooves are moved to the inserted position, the stopper member abuts the rear ends of the plurality of slidable guiding grooves to prevent the plurality of slidable guiding groove from continuing to move toward the hard disk socket after arriving at the inserted position wherein the rear end of each restricting groove is connected to an exit hole, each exit hole has a diameter larger than the width of the restricting groove, and the center position of the exit hole is positioned at a position which is offset from the second position of the restricting groove toward the rear side of the hard disk accommodating casing for a predetermined distance;

wherein each guiding member has a guiding pillar and an engagement end arranged on the end of the guiding pillar, the diameter of the guiding pillar is smaller than the width of the restricting groove, the diameter of the engagement end is larger than the width of the restricting groove and smaller than the diameter of the exit hole, and when the guiding member is engaged into the restricting groove, the engagement end is positioned at the outer side of the side fixing board.

8. The hard disk replacement module according to claim 7, wherein the front end of each slidable guiding groove has a hard disk engagement member arranged thereon, each hard disk engagement member comprises:

a resilient arm, the resilient arm has a fixed end and an active end, the fixed end is connected to the side surfaces of the slidable guiding grooves, the active end obliquely extends toward the front end of the slidable guiding groove and away from the outer side surface of the slidable guiding groove; and a lock pin, the lock pin is arranged at the inner side of the active end of the resilient arm, and the position of the lock pin is corresponded to the position of a fixing tapped hole positioned at the side surface of each hard disks;

wherein the side surface of each slidable guiding groove corresponding to the lock pin has a notch portion arranged thereon, the lock pin is configured to pass through the notch portion from the outer side of the slidable guiding groove and reach the inner side surface of the slidable guiding groove;

wherein when the plurality of slidable guiding grooves are moved to the exit position, the lock pin of the hard disk engagement member is driven by the resilient arm and separated from the fixing tapered hole, and when the slidable guiding grooves are moved toward the inserted position, the outer side surface of each resilient arm is abutted by the inner side surface of the side fixing unit, and the resilient arm is moved toward the hard disk and the lock pin is engaged into the fixing tapered hole.

9. The hard disk replacement module according to claim 8, wherein the side fixing unit further comprises a substrate, the substrate is arranged on the outer side surface of the side fixing board, the inner side surface of the substrate corresponding to the hard disk socket has a plurality of light guiding grooves, the plurality of light guiding grooves extend from the rear side of the substrate to the front side of the substrate, and each light guiding groove has a light guiding element accommodated therein.

10. The hard disk replacement module according to claim 9, wherein the substrate comprises a plurality of substrate units, the upper edge of each substrate unit is connected to the lower edge of the substrate unit adjacent thereto for stacking the plurality of substrate units to form the substrate, and the side fixing board is fixed on a side surface of the plurality of substrate units through screwing, the plurality of light guiding grooves are arranged on a side surface of each substrate unit.

\* \* \* \* \*